United States Patent [19]

Komorita et al.

[11] 4,128,432

[45] Dec. 5, 1978

[54] OPTICAL GLASS

[75] Inventors: Fujio Komorita, Hachioji; Muneo Nakahara, Sagamihara, both of Japan

[73] Assignee: Kabushiki Kaisha Ohara Kogaku Garasu Seizosho, Sagamihara, Japan

[21] Appl. No.: 903,412

[22] Filed: May 8, 1978

[30] Foreign Application Priority Data

May 19, 1977 [JP] Japan ................................ 52-57047

[51] Int. Cl.$^2$ ........................... C03C 3/10; C03C 3/00
[52] U.S. Cl. ...................................... 106/53; 106/54; 106/47 Q
[58] Field of Search ........................ 106/47 Q, 53, 54

[56] References Cited

U.S. PATENT DOCUMENTS

| | | | |
|---|---|---|---|
| 3,650,780 | 3/1972 | Connelly | 106/47 Q |
| 3,879,207 | 4/1975 | Hartman | 106/47 Q |
| 3,999,996 | 12/1976 | Faulstich et al. | 106/47 Q |
| 3,999,997 | 12/1976 | Faulstich et al. | 106/47 Q |

Primary Examiner—O. R. Vertiz
Assistant Examiner—Mark Bell
Attorney, Agent, or Firm—Ladas, Parry, Von Gehr, Goldsmith & Deschamps

[57] ABSTRACT

An optical glass consisting basically of a $B_2O_3$-$La_2O_3$-$ZrO_2$-$Nb_2O_5$-PbO-BaO (and/or ZnO) system is free from a poisonous CdO or $ThO_2$ component and has an excellent light transmission property in a transition region from an ultraviolet portion to a visible portion as compared with conventional optical glasses having the same optical properties.

1 Claim, 5 Drawing Figures

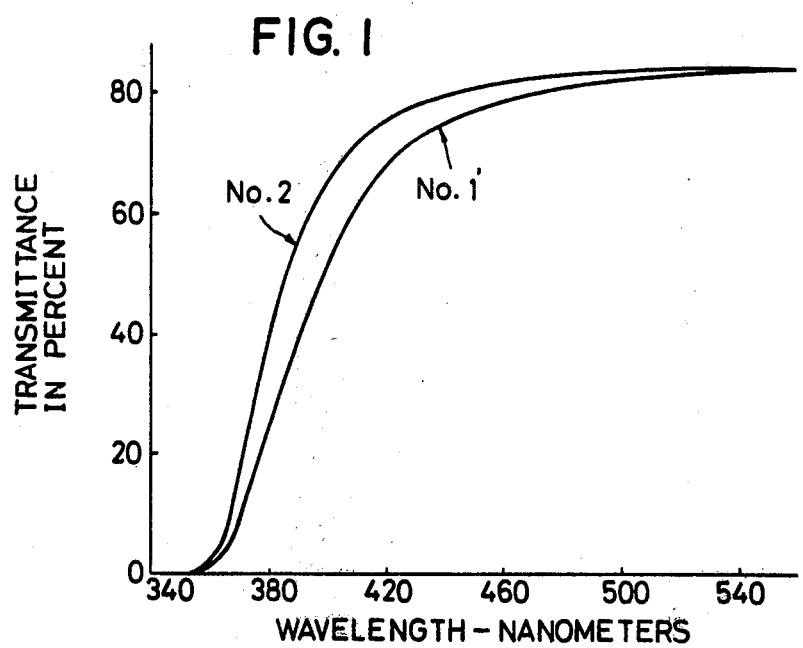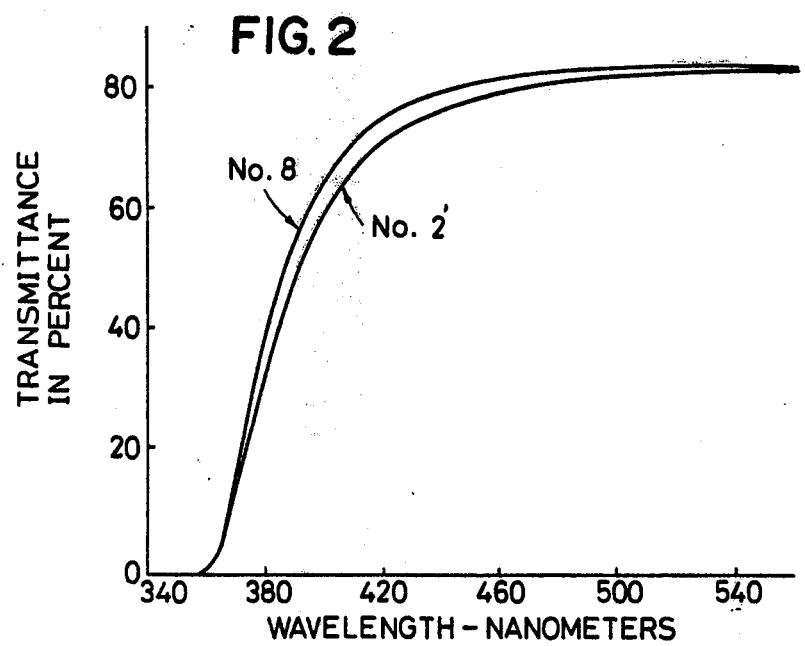

OPTICAL GLASS

BACKGROUND OF THE INVENTION

This invention relates to an optical glass having refractive indices (nd) of about 1.770 to about 1.875 and Abbe value (νd) of about 37.5 to about 28.5 and consisting basically of a $B_2O_3$ - $La_2O_3$ - $ZrO_2$ - $Nb_2O_5$ - PbO - BaO (and/or ZnO) system. As compared with known optical glasses having the above mentioned high refractive indices, the optical glass according to the invention is so excellent in its light transmission property in a transition region from an ultraviolet portion to a visible portion of light that the optical glass is substantially free from undesirable colouring.

Known in the art of the optical glass having above described optical properties are ones consisting of a $SiO_2$ - $B_2O_3$ - $La_2O_3$ - $ZrO_2$ - $ThO_2$ - $TiO_2$ - BaO - $Nb_2O_5$ system as disclosed in British Patent No. 1235206, a $B_2O_3$ - $SiO_2$ - $La_2O_3$ - $TiO_2$ - CdO system as disclosed in German Patent No. 1147359, a $B_2O_3$ - $La_2O_3$ - $ThO_2$ - $ZrO_2$ - PbO - ZnO system as disclosed in German Patent No. 958150, a $SiO_2$ - $La_2O_3$ - $ZrO_2$ (and/or $Ta_2O_5$) - BaO system as disclosed in Japanese Laid-Open Publication No. 73914/1975 and a $B_2O_3$ - $SiO_2$ - $La_2O_3$ - $ZrO_2$ (and/or $Ta_2O_5$) - ZnO as disclosed in Japanese Laid-Open Publication No. 53413/1975. The optical glass including CdO or $ThO_2$ is poisonous, whereas the optical glass containing a large amount of $SiO_2$ or ZnO without including CdO or $ThO_2$ has some difficulty in melting. The optical glass not containing a large amount of $SiO_2$ or ZnO but containing a relatively large amount of $TiO_2$ is extremely low in light transmission in the transition region from an ultraviolet portion to a visible portion with a resulting strong tendency to colouring which causes a serious disadvantage in an optical design.

SUMMARY OF THE INVENTION

It is, therefore, an object of the present invention to provide an optical glass which has eliminated the above described disadvantage of the prior art optical glasses.

Laborious studies and experiments made by the inventors of the present invention have resulted in a finding that an optical glass which is basically made of a $B_2O_3$ - $La_2O_3$ - PbO system with added $ZrO_2$, $Nb_2O_5$ and BaO and/or ZnO has the above described optical properties, is free of poisonous ingredients, superior in light transmission in the transition region from the ultraviolet portion to the visible portion to the prior art optical glasses, stable owing to a sufficiently small devitrification tendency and easy to homogenize.

According to the present invention, there is provided an optical glass consisting of a composition in weight percent of 3 to 30% $B_2O_3$, 0 to 19.5% $SiO_2$, the sum of said $B_2O_3$ and $SiO_2$ being 18 to 30%, 9 to 32% $La_2O_3$, 1 to 8% $ZrO_2$, 4 to 25% $Nb_2O_5$, 2 to 50% PbO, 0 to 30% BaO, 0 to 9.5% ZnO, the sum of said BaO and ZnO being 1 to 33%, 0 to 3% $Li_2O$, 0 to 3% $Na_2O$, 0 to 3% $K_2O$, 0 to 8% MgO, 0 to 10% CaO, 0 to 20% SrO, 0 to 5% $Al_2O_3$, 0 to 0.5% $As_2O_3$, 0 to 0.5% $Sb_2O_3$, 0 to 5% $Bi_2O_3$, 0 to 13% $TiO_2$, 0 to 5% $GeO_2$ and 0 to 10% $Ta_2O_5$.

DETAILED DESCRIPTION OF THE INVENTION

Figure 3:
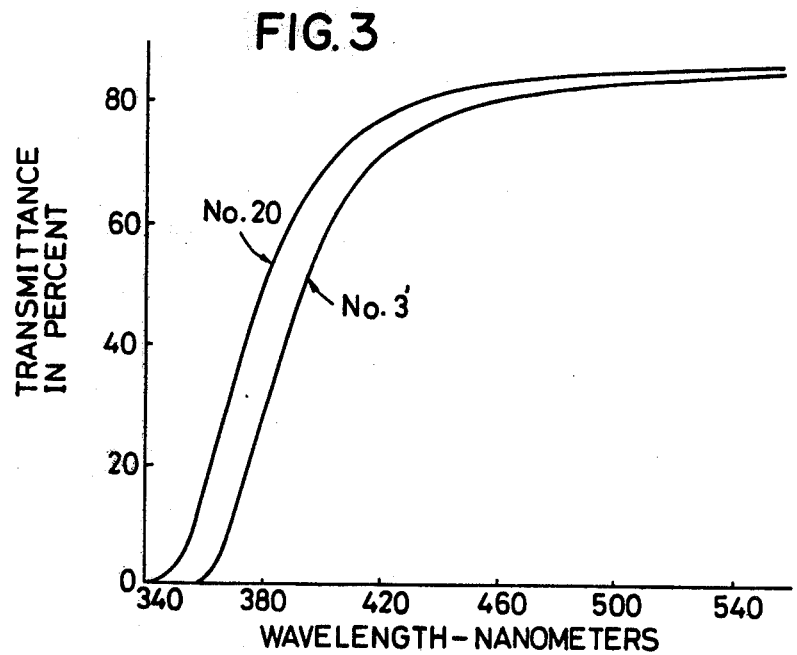
Figure 4:
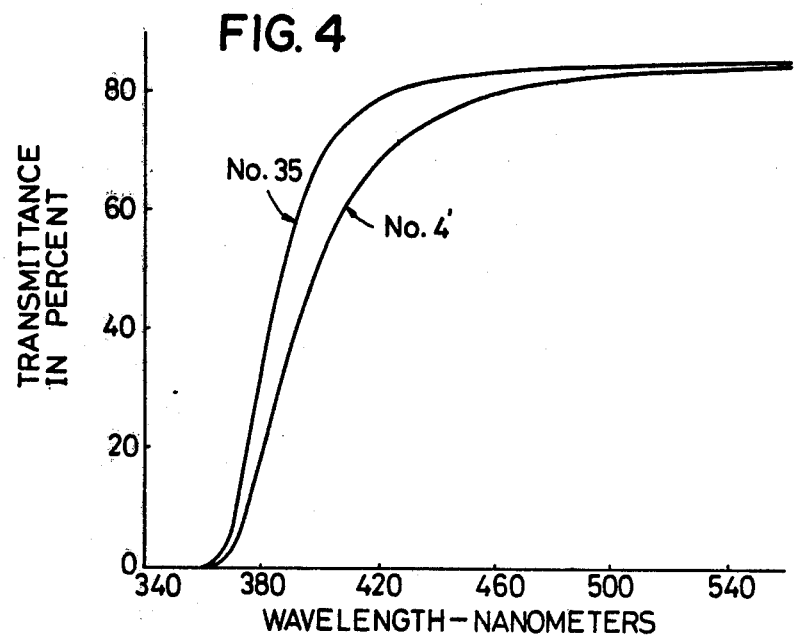
Figure 5:
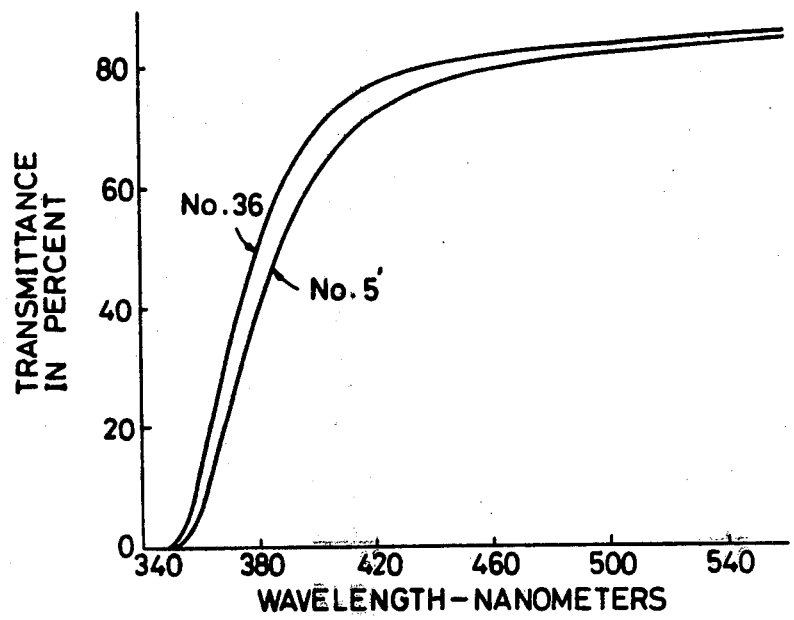

The invention will now be described with reference to the accompanying drawings in which FIGS. 1 through 5 respectively show transmittance curves of the optical glasses made according to the invention and the prior art optical glasses in comparison.

In the optical glass made according to the present invention, the above described composition is selected for reasons stated below.

As is well known, $B_2O_3$ and $SiO_2$ are essential glass forming ingredients. If the content of $B_2O_3$ is less than 3%, a devitrification tendency increases and a stable glass cannot be obtained. If the content of $B_2O_3$ exceeds 30%, the desired optical properties cannot be obtained. Besides being the essential glass forming ingredient, $SiO_2$ is effective for increasing viscosity. If, however, the content of $SiO_2$ exceeds 19.5%, viscosity becomes too high to form a seed-free and homogeneous glass. If the sum of $B_2O_3$ and $SiO_2$ is less than 18%, the devitrification tendency increases whereas if the sum of $B_2O_3$ and $SiO_2$ exceeds 30%, the desired optical properties cannot be realized.

$La_2O_3$ is an essential ingredient for affording the desired high refractivity to the optical glass. $La_2O_3$ is also effective for improving chemical durability. If the content of $La_2O_3$ is less than 9%, the desired light transmission property and the desired optical properties cannot be achieved whereas increasing the content of $La_2O_3$ above 32% increases the devitrification tendency.

$ZrO_2$ contributes to increasing the refractive index and decreasing the devitrification tendency. If the content of $ZrO_2$ is less than 1%, the above mentioned effects will be extremely reduced whereas if the content of $ZrO_2$ exceeds 8%, the raw material becomes harder to melt resulting in occurrence of inhomogeneity in the produced glass.

$Nb_2O_5$ is a useful ingredient for increasing the refractive index, decreasing the Abbe values and preventing devitrification. If the content of $Nb_2O_5$ is less than 4%, the above mentioned effects of $Nb_2O_5$ are extremely reduced whereas if the content of $Nb_2O_5$ exceeds 25%, the produced glass is coloured to an undesirable degree.

PbO is a useful ingredient for increasing the refractive index, decreasing the Abbe values and lowering viscosity of the melt. If the content of PbO is less than 2%, the refractive index decreases resulting in failure to satisfy the desired optical properties whereas if the content of PbO exceeds 50%, the devitrification tendency increases and the produced glass is undesirably coloured.

BaO contributes to lowering viscosity of the melt facilitating melting of the $SiO_2$ material and decreasing the devitrification tendency. If the content of BaO exceeds 30%, chemical durability will be undesirably reduced.

ZnO is an effective ingredient for decreasing viscosity of the melt, facilitating melting of the $SiO_2$ material, inhibiting the devitrification tendency and improving chemical durability. If the content of ZnO exceeds 9.5%, the devitrification tendency increases.

If the sum of BaO and ZnO is less than 1%, it is difficult to obtain an optical glass which is stable to the devitrification tendency whereas if the sum of BaO and ZnO exceeds 33%, decrease in the refractive index or increase in the devitrification tendency will result.

According to the invention, by adding the following ingredients to the above described essential ingredients, melting property and stability of the produced glass can be improved and its optical properties can be made varied.

$Li_2O$, $Na_2O$ and $K_2O$ are useful for facilitating melting of the $SiO_2$ material and lowring viscosity of the glass but if the content of one of these oxides exceeds 3%, chemical durability decreases and the devitrification tendency increases.

MgO, CaO and SrO have functions to reduce viscosity of glass in melting and facilitate melting of the $SiO_2$ material into the glass. Further, MgO is useful for increasing chemical durability while CaO and SrO are useful for increasing the Abbe values. For making a stable glass with sufficiently small devitrification tendency, the content of MgO must be up to 8%, that of CaO up to 10% and that of SrO up to 20%.

$Al_2O_3$ is useful for improving chemical durability and facilitating melting of the $SiO_2$ material but increasing $Al_2O_3$ above 5% increases the devitrification tendency.

$As_2O_3$ and $Sb_2O_3$ have a function of facilitating elimination of seeds in melting of glass but the content thereof should be held up to 0.5%, for otherwise stability to devitrification will be lost.

$Bi_2O_3$ is a useful ingredient for increasing the refractive index and decreasing the Abbe values. If the content of $Bi_2O_3$ exceeds 5%, the produced glass will be undesirably coloured.

$TiO_2$ is useful for increasing the refractive index, decreasing the Abbe values, improving chemical durability and preventing the devitrification tendency. If the content of $TiO_2$ exceeds 13%, the desired improvement in transmission in the transition region from the ultraviolet portion to the visible portion cannot be attained.

$GeO_2$ is useful for increasing viscosity and preventing the devitrification tendency. If, however, the content of $GeO_2$ exceeds 5%, the devitrification tendency increases rather than decreases.

$Ta_2O_5$ contributes to increasing the refractive index and making a stable optical glass. If the content of $Ta_2O_5$ exceeds 10%, an unmelted material will remain after melting resulting in inhomogeneity in the produced glass.

The following Table 1 shows 36 examples of compositions of the optical glass made according to the present invention, (Table 1-a), optical properties of the produced glasses and light wavelengths which exhibit transmittance of 5% and 80% in a glass specimen which is 10 mm in thickness and is polished on either surface (Table 1-b):

Table 1 - a

| No. | $B_2O_3$ | $SiO_2$ | $La_2O_3$ | $ZrO_2$ | $Nb_2O_5$ (weight percent) | PbO | BaO | ZNO | | | | |
|---|---|---|---|---|---|---|---|---|---|---|---|---|
| 1 | 7.0 | 19.5 | 17.5 | 5.5 | 13.0 | 13.0 | 17.5 | 7.0 | | | | |
| 2 | 20.0 | 4.0 | 23.0 | 5.0 | 10.0 | 29.0 | 9.0 | | | | | |
| 3 | 5.0 | 15.0 | 13.0 | 5.5 | 11.0 | 19.0 | 22.5 | 9.0 | | | | |
| 4 | 30.0 | | 19.5 | 5.0 | 10.5 | 28.0 | 7.0 | | | | | |
| 5 | 13.0 | 15.0 | 9.0 | 6.0 | 10.0 | 15.0 | 23.0 | 9.0 | | | | |
| 6 | 13.0 | 11.0 | 32.0 | 5.0 | 6.0 | 30.0 | 3.0 | | | | | |
| 7 | 14.0 | 11.0 | 18.0 | 8.0 | 7.0 | 29.0 | 13.0 | | | | | |
| 8 | 20.0 | 4.0 | 23.0 | 1.0 | 14.0 | 29.0 | 9.0 | | | | | |
| 9 | 19.0 | 7.0 | 19.5 | 5.0 | 4.0 | 25.0 | 16.5 | 4.0 | | | | |
| 10 | 5.5 | 19.0 | 14.5 | 5.5 | 25.0 | 2.0 | 19.0 | 9.5 | | | | |
| 11 | 18.0 | 6.0 | 24.0 | 5.0 | 7.0 | 33.0 | | 7.0 | | | | |
| 12 | 7.5 | 19.0 | 12.0 | 5.5 | 13.0 | 13.0 | 30.0 | | | | | |
| 13 | 3.0 | 17.0 | 13.5 | 5.5 | 15.0 | 15.0 | 23.0 | 8.0 | | | | |
| 14 | 19.0 | 11.0 | 19.0 | 6.0 | 12.5 | 16.0 | 16.5 | | | | | |
| 15 | 17.0 | 11.0 | 28.0 | 5.0 | 7.0 | 31.0 | 1.0 | | | | | |
| 16 | 8.0 | 15.0 | 14.0 | 5.5 | 7.5 | 17.0 | 25.0 | 8.0 | | | | |
| 17 | 6.0 | 19.0 | 13.5 | 5.5 | 12.5 | 10.0 | 21.0 | 9.0 | $Li_2O$ 3.0 | | | $As_2O_3$ 0.5 |
| 18 | 5.0 | 19.0 | 12.5 | 5.5 | 13.0 | 13.0 | 20.5 | 8.0 | $Na_2O$ 3.0 | | | $Sb_2O_3$ 0.5 |
| 19 | 5.5 | 19.0 | 12.5 | 5.5 | 13.0 | 13.0 | 19.5 | 9.0 | $K_2O$ 3.0 | | | |
| 20 | 12.5 | 12.0 | 12.5 | 5.5 | 13.0 | 13.0 | 15.5 | 8.0 | | | | MgO 8.0 |
| 21 | 12.0 | 13.5 | 13.5 | 5.5 | 12.5 | 10.0 | 14.0 | 7.0 | $Li_2O$ 2.0 | | | CaO 10.0 |
| 22 | 15.0 | 9.5 | 12.5 | 5.5 | 13.0 | 13.0 | 11.5 | | | | | SrO 20.0 |
| 23 | 14.5 | 10.0 | 10.5 | 5.5 | 10.0 | 17.0 | 18.5 | 9.0 | | | | CaO 5.0 |
| 24 | 13.0 | 11.0 | 15.5 | 5.0 | 23.0 | 14.5 | 8.0 | | | | | SrO 10.0 |
| 25 | 13.0 | 9.0 | 22.5 | 5.0 | 10.5 | 21.0 | 5.0 | 9.0 | $Al_2O_3$ 5.0 | | | |
| 26 | 19.0 | 7.0 | 19.5 | 5.0 | 4.5 | 20.0 | 16.5 | 4.0 | | $TiO_2$ 4.5 | | |
| 27 | 5.0 | 17.5 | 19.5 | 7.5 | 6.0 | 5.0 | 24.5 | | $Li_2O$ 2.0 | $TiO_2$ 13.0 | | |
| 28 | 22.0 | 4.5 | 12.5 | 5.5 | 10.0 | 13.0 | 16.5 | 6.0 | | | $Ta_2O_5$ 10.0 | |
| 29 | 20.0 | 3.0 | 20.0 | 5.0 | 10.0 | 20.0 | 10.0 | 7.0 | | | $GeO_2$ 5.0 | |
| 30 | 20.5 | 5.0 | 13.5 | 5.5 | 12.5 | 5.0 | 25.0 | 8.0 | | | $Bi_2O_3$ 5.0 | |
| 31 | 16.0 | 6.0 | 19.0 | 6.0 | 11.0 | 30.0 | 10.0 | 2.0 | | | | |
| 32 | 16.0 | 11.0 | 13.0 | 3.0 | 11.5 | 12.0 | 16.0 | 6.0 | | $TiO_2$ 11.5 | | |
| 33 | 18.1 | 10.0 | 10.0 | 3.0 | 4.5 | 50.0 | 4.0 | | | | | $As_2O_3$ 0.4 |
| 34 | 18.0 | 11.0 | 11.5 | 3.0 | 6.5 | 45.5 | 4.4 | | | | | $As_2O_3$ 0.1 |
| 35 | 11.0 | 7.0 | 11.0 | 1.5 | 10.0 | 31.0 | 27.0 | | | | $Al_2O_3$ 1.3 | $As_2O_3$ 0.2 |
| 36 | 5.5 | 19.0 | 12.5 | 5.5 | 13.0 | 13.0 | 20.0 | 8.5 | $Li_2O$ 2.6 | | | $As_2O_3$ 0.4 |

Table 1 - b

| No. | Optical properties | | Light transmitting wavelength (nm) | |
|---|---|---|---|---|
| | nd | νd | Transmittance 5% | Transmittance 80% |
| 1 | 1.8115 | 35.4 | 352 | 433 |
| 2 | 1.8479 | 32.0 | 364 | 439 |
| 3 | 1.8515 | 31.8 | 363 | 441 |
| 4 | 1.7900 | 32.8 | 363 | 438 |
| 5 | 1.7917 | 34.8 | 362 | 442 |
| 6 | 1.8544 | 31.3 | 351 | 428 |
| 7 | 1.8389 | 31.9 | 363 | 437 |
| 8 | 1.8615 | 31.0 | 364 | 439 |
| 9 | 1.7976 | 35.6 | 362 | 438 |
| 10 | 1.8217 | 33.4 | 338 | 427 |
| 11 | 1.8515 | 30.6 | 361 | 441 |
| 12 | 1.7988 | 35.3 | 359 | 445 |
| 13 | 1.8555 | 31.7 | 362 | 437 |
| 14 | 1.7736 | 36.5 | 356 | 434 |
| 15 | 1.8274 | 32.1 | 362 | 440 |
| 16 | 1.8144 | 34.3 | 366 | 445 |
| 17 | 1.7931 | 36.2 | 347 | 412 |
| 18 | 1.7943 | 34.5 | 359 | 441 |
| 19 | 1.8099 | 34.7 | 352 | 429 |
| 20 | 1.8094 | 35.4 | 354 | 431 |
| 21 | 1.7971 | 37.3 | 349 | 428 |
| 22 | 1.8133 | 36.1 | 359 | 429 |
| 23 | 1.7999 | 35.7 | 354 | 431 |
| 24 | 1.8236 | 33.1 | 364 | 443 |
| 25 | 1.8261 | 33.1 | 358 | 437 |
| 26 | 1.8251 | 33.3 | 374 | 445 |
| 27 | 1.8580 | 30.4 | 358 | 445 |
| 28 | 1.8115 | 35.4 | 350 | 427 |
| 29 | 1.8248 | 33.4 | 378 | 436 |
| 30 | 1.7931 | 36.4 | 347 | 412 |
| 31 | 1.8727 | 31.2 | 365 | 443 |
| 32 | 1.8359 | 30.5 | 375 | 425 |
| 33 | 1.8122 | 28.6 | 375 | 448 |
| 34 | 1.7961 | 29.9 | 371 | 442 |
| 35 | 1.8356 | 30.6 | 369 | 424 |
| 36 | 1.8021 | 34.6 | 355 | 435 |

Table 2 shows examples (Nos. 1'–5') of compositions of conventional optical glasses which correspond to the compositions Nos. 2, 8, 20, 35 and 36 in Table 1 and have substantially equivalent optical properties and also shows light wavelengths which exhibit transmittance of 5% and 80%. FIGS. 1 through 5 of the accompanying drawings show light transmittance curves of the compositions Nos. 2, 8, 20, 35 and 36 in comparison with their corresponding conventional compositions.

Table 2

| No. | Conventional optical glasses (weight percent) | | | | |
|---|---|---|---|---|---|
| | 1' | 2' | 3' | 4' | 5' |
| $SiO_2$ | 22.7 | 14.0 | 5.5 | 23.5 | 24.5 |
| $B_2O_3$ | | 9.0 | 16.0 | 2.0 | |
| $La_2O_3$ | 20.4 | 18.0 | 19.6 | 10.8 | 8.6 |
| $ZrO_2$ | 7.2 | 6.0 | | 4.9 | 5.4 |
| $Nb_2O_5$ | 7.1 | 11.0 | 10.0 | 6.0 | 13.1 |
| $Li_2O$ | 2.0 | | | 1.0 | 2.0 |
| $TiO_2$ | 12.0 | | 7.1 | 13.1 | |
| $As_2O_3$ | 0.1 | | | 0.3 | |
| $Sb_2O_3$ | 0.1 | | | | |
| BaO | 28.4 | | 40.3 | 28.6 | 33.4 |
| PbO | | 23.0 | 1.5 | 9.8 | 13.0 |

Table 2-continued

| No. | Conventional optical glasses (weight percent) | | | | |
|---|---|---|---|---|---|
| | 1' | 2' | 3' | 4' | 5' |
| ZnO | | 19.0 | | | |
| Optical properties nd | 1.8491 | 1.8641 | 1.8052 | 1.8347 | 1.8001 |
| νd | 32.0 | 31.2 | 35.3 | 30.3 | 34.8 |
| Light transmitting Wavelengths (nm) transmittance 5% | 365 | 364 | 365 | 372 | 359 |
| transmittance 80% | 471 | 464 | 463 | 460 | 470 |

As will be apparent from these tables and figures, the light transmittance curves of the optical glass made according to the present invention are all plotted on the shorter wavelength side of the light transmission curves of the conventional optical glasses and it will be understood that the optical glass made according to the invention is markedly superior in light transmission to the conventional optical glasses.

The optical glass according to the invention is obtained by melting the raw materials in a platinum crucible or the like at 1200°–1350° C., mixing the melt and eliminating seeds therefrom until the melt is homogenized, lowering the temperature to a suitable temperature, pouring the melt in a mould and thereafter annealing the melt.

As described in the foregoing, the optical glass according to the present invention has optical properties of refractive indices (nd) of about 1.770 to about 1.875 and Abbe values (νd) of about 37.5 to about 28.5 and consists basically of a $B_2O_3$ - $La_2O_3$ - $ZrO_2$ - $Nb_2O_5$ - PbO - BaO (and/or ZnO) system without using the poisonous CdO or $ThO_2$ component contained in the prior art optical glasses having substantially equal optical properties. The optical glass according to the invention is higher in light transmittance in the transition region in the ultraviolet portion to the visible portion than the prior art optical glasses and therefore is advantageous in the optical design. Further, the optical glass according to the invention is of a low viscosity and this facilitates melting of the raw materials, elimination of seeds and homogenization of the melt.

What is claimed is:

1. An optical glass consisting of a composition in weight percent of 3 to 30% $B_2O_3$, 0 to 19.5% $SiO_2$, the sum of said $B_2O_3$ and $SiO_2$ being 18 to 30%, 9 to 32% $La_2O_3$, 1 to 8% $ZrO_2$, 4 to 25% $Nb_2O_5$, 2 to 50% PbO, 0 to 30% BaO, 0 to 9.5% ZnO, the sum of said BaO and ZnO being 1 to 33%, 0 to 3% $Li_2O$, 0 to 3% $Na_2O$, 0 to 3% $K_2O$, 0 to 8% MgO, 0 to 10% CaO, 0 to 20% SrO, 0 to 5% $Al_2O_3$, 0 to 0.5% $As_2O_3$, 0 to 0.5% $Sb_2O_3$, 0 to 5% $Bi_2O_3$, 0 to 13% $TiO_2$, 0 to 5% $GeO_2$ and 0 to 10% $Ta_2O_5$.

* * * * *